US006957188B1

(12) United States Patent
Dellevi et al.

(10) Patent No.: US 6,957,188 B1
(45) Date of Patent: Oct. 18, 2005

(54) COMPUTERIZED-INTERACTIVE SHIFT TRADE RECORDING SYSTEM

(76) Inventors: Andre-Roger Henry Dellevi, 17 Peninsula Crescent, Richmond Hill, Ontario (CA) L4S 1T9; Joseph Edward Dennie, 97 Poirier Drive, Moncton, New Brunswick (CA) E1C 7R9

(*) Notice: Subject to any disclaimer, the term of this patent is extended or adjusted under 35 U.S.C. 154(b) by 0 days.

(21) Appl. No.: 09/234,695

(22) Filed: Jan. 21, 1999

(51) Int. Cl.[7] ............................................. G06F 17/60
(52) U.S. Cl. ................................. 705/9; 705/8; 705/10
(58) Field of Search ............................... 705/9, 7, 8, 10

(56) References Cited

U.S. PATENT DOCUMENTS

| 5,111,391 | A | * | 5/1992 | Fields et al. ..................... 705/9 |
| 5,325,292 | A | * | 6/1994 | Crockett ......................... 705/9 |
| 5,369,570 | A | * | 11/1994 | Parad ............................. 705/8 |
| 5,907,829 | A | * | 5/1999 | Kida .............................. 705/9 |
| 5,974,392 | A | * | 10/1999 | Endo .............................. 705/7 |
| 5,974,394 | A | * | 10/1999 | Nakayama et al. ............. 705/8 |
| 6,049,776 | A | * | 4/2000 | Donnelly et al. ........... 700/100 |
| 6,192,346 | B1 | * | 2/2001 | Green ............................. 705/9 |
| 6,278,978 | B1 | * | 8/2001 | Andre et al. ..................... 705/9 |
| 6,334,133 | B1 | * | 12/2001 | Thompson et al. ...... 707/104.1 |
| 6,594,637 | B1 | * | 7/2003 | Furukawa et al. ............. 705/9 |

FOREIGN PATENT DOCUMENTS

JP 06223075 A * 8/1994 ........... G06F 15/21

OTHER PUBLICATIONS

Sprout, Alison L, "Scheduling your forces with a PC", Fortune, May 30, 1994 [retrieved Sep. 24, 2002], vol 129, Issue 11, 3 pages, Retrieved from: Proquest Direct.*

Holzberg, Carol, "PeopleScheduler 3.0", Home Office Computing, Oct. 1997 [retrieved on Sep. 24, 2002] vol. 15, Issue 10, 2 pages, Retrieved from: Proquest Direct.*
Feibus, Andy, "Make short work of employee scheduling", InformationWeek, Apr. 20, 1998 [retrieved on Sep. 24, 2002], Issue 678, 3 pages, Retrieved from: Proquest Direct.*
"Visual Rota from CDT", www.btinternet.com/~vrota, 1998 [retrieved Apr. 14, 2003], pp. 1-5, retrieved from google. com.*
University of Kentucky, "Shift and Schedule Changes", www.mc.uky.edu/mcppd/policy/30_17.htm, May 8, 1992 [retrieved Apr. 10, 2002], 2 pages, retrieved from: google. com.*
ScheduleSoft, "ScheduleSoft simplifies scheduling", www. schedulesoft.com/whatsnew/press_release1.htm, Jun. 6, 1998 [retrieved Apr. 14, 2003], 2 pages, retrieved from: google.com.*

(Continued)

Primary Examiner—Tariq R. Hafiz
Assistant Examiner—B. Van Doren (57) ABSTRACT

An article of manufacture is provided including a computer with memory including stored therein a first list of employees each having a criteria of eligibility data associated therewith and a second list of work area functions each having a criteria of eligibility data associated therewith; a computer usable code having a computer readable program code medium embodied therein for controlling the transfer of a shift change in a place of employment, the computer readable program code medium in said article of manufacture including computer-readable program code for causing the computer to ascertain an identity of an owner of a shift, computer-readable program code for causing the computer to ascertain an identity of a recipient of a shift, and computer-readable program code for causing the computer to approve the transferring of a shift of the owner to the recipient only if the eligibility data of the recipient matches that of the work area function associated with the shift of the owner.

10 Claims, 13 Drawing Sheets

OTHER PUBLICATIONS

ScheduleSoft, "ScheduleSoft Boosts efficiency", www.schedulesoft.com/whatsnew/press_release1.htm, Oct. 2, 1998 [retrieved Apr. 14, 2003], 3 pages, retrieved from: google.com.*

InTime Solutions, "InTime Visual Scheduler", www.intimesoft.com, Apr. 12, 1997 [retrieved Apr. 10, 2003], pp. 1-3, retrieved from: Google.com.*

"Special HR Software Directories", www.hrcensus.com/SPECmain.html, Jul. 7, 1998 [retrieved Apr. 10, 2003], pp. 1-6, retrieved from: Google.com.*

"Visual Rota from CDT", www.btinternet.com/~vrota, 1998 [retrieved Apr. 14, 2003], pp. 1-5, retrieved from google.com.*

Liddle, Alan, "People-Single Point of Difference", Nation's Restaurant News, Oct. 6, 1997 [retrieved Nov. 18, 2003], 4 pages, retrieved from: STN.*

MizziSoft, www.mizzisoft.com, Dec. 7, 1998 [retrieved Jun. 8, 2004], pp. 1-23, retrieved from: archive.org and google.com.*

Primetime, www.blue-pumpkin.com, Blue Pumpkin Software, Jan. 28, 1998 [retrieved Jun. 1, 2004], pp. 1-7, retrieved from: Archive.org and google.com.*

Advanced Personnel Systems, www.hrcensus.com, Feb. 6, 1997 [retrieved on Apr. 10, 2003], pp. 1-4, retrieved from: Archive.org and google.com.*

"Security System Minimizes Baggage", Business Computing Brief, Feb. 2, 1995 [retrieved Apr. 28, 2005], pp. 1-3, retrieved from: Dialog, File 636.*

Eliot, Lance B., "Scheduling Time for AI", AI Expert, Nov. 1993 [retrieved Apr. 28, 2005], vol. 8, No. 11, pp. 1-4, retrieved from: Dialog, file 275.*

Adaptiv Software Corporation, www.adaptiv.com, Dec. 10, 1997 [retrieved Apr. 27, 2005], 29 pages, retreievd from: Google.com and archive.org.*

Atlas Business Solutions, "Visual Staff Scheduler PRO and Staff Files", www.abs-usa.com, Dec. 6, 1998 [retrieved Apr. 29, 2005], 19 pages, retrieved from: Google.com and archive.org.*

InTime Solutions, Inc., www.intimesoft.com, Jul. 10, 1998 [retrieved Apr. 26, 2005], 14 pages, retrieved from: Google.com and archive.org.*

"1996 SLD Shift Policy", www-sla.slac.stanford.edu/wldwww/shifts/1996_policy.html, 1996 [retrieved Apr. 26, 2005], pp. 1-4, retrieved from: Google.com.*

* cited by examiner

FIG. 13

COMPUTERIZED-INTERACTIVE SHIFT TRADE RECORDING SYSTEM

BACKGROUND OF THE INVENTION

1. Field of the Invention

The present invention relates to employee shift scheduling devices and more particularly pertains to a new computerized-interactive shift trade recording system for managing shift trading between various employees of an organization in a manner that ensures that employees are qualified for the work functions that they are trading.

2. Description of the Prior Art

The use of employee shift scheduling devices is known in the prior art. More specifically, employee shift scheduling devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art employee shift scheduling devices include U.S. Pat. No. 5,414,847; U.S. Pat. No. 5,418,965; U.S. Pat. No. 5,339,424; U.S. Pat. No. 5,124,909; U.S. Pat. No. 5,313,615; and U.S. Pat. No. 4,868,785 which are each incorporated herein by reference.

In these respects, the computerized-interactive shift trade recording system according to the present invention substantially departs from the conventional concepts and designs of the prior art, and in so doing provides an apparatus primarily developed for the purpose of managing shift trading between various employees of an organization in a manner that ensures that employees are qualified for the work functions that they are trading.

SUMMARY OF THE INVENTION

In view of the foregoing disadvantages inherent in the known types of employee shift scheduling devices now present in the prior art, the present invention provides a new computerized-interactive shift trade recording system construction wherein the same can be utilized for managing shift trading between various employees of an organization in a manner that ensures that employees are qualified for the work functions that they are trading.

The general purpose of the present invention, which will be described subsequently in greater detail, is to provide a new computerized-interactive shift trade recording system apparatus and method which has many of the advantages of the employee shift scheduling devices mentioned heretofore and many novel features that result in a new computerized-interactive shift trade recording system which is not anticipated, rendered obvious, suggested, or even implied by any of the prior art employee shift scheduling devices, either alone or in any combination thereof.

Figure 9:
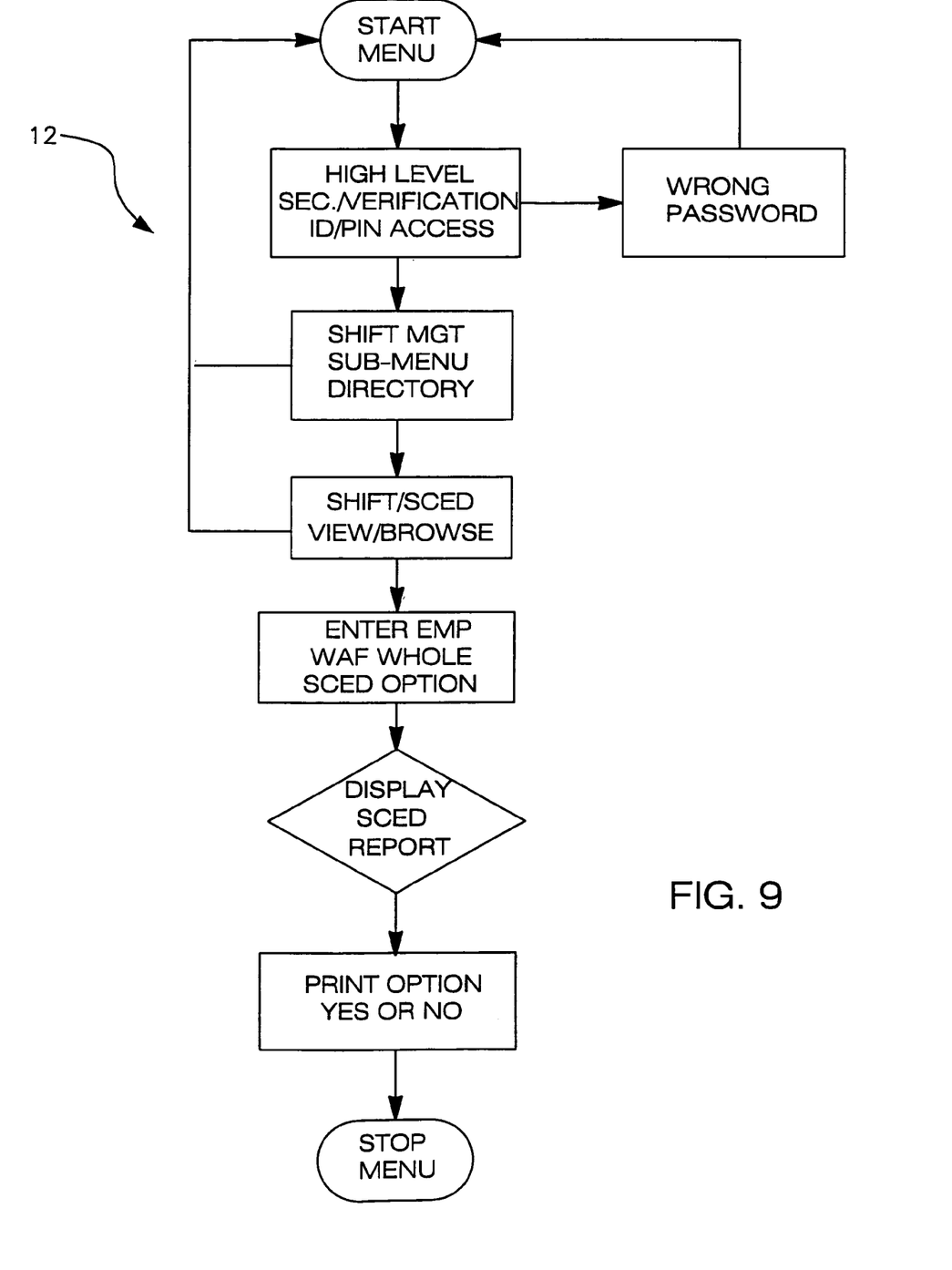
FIG. 9 is a flow chart delineating the subroutine associated with the program code for causing the computer to allow the browsing and printing of the fourth list.
Figure 10:
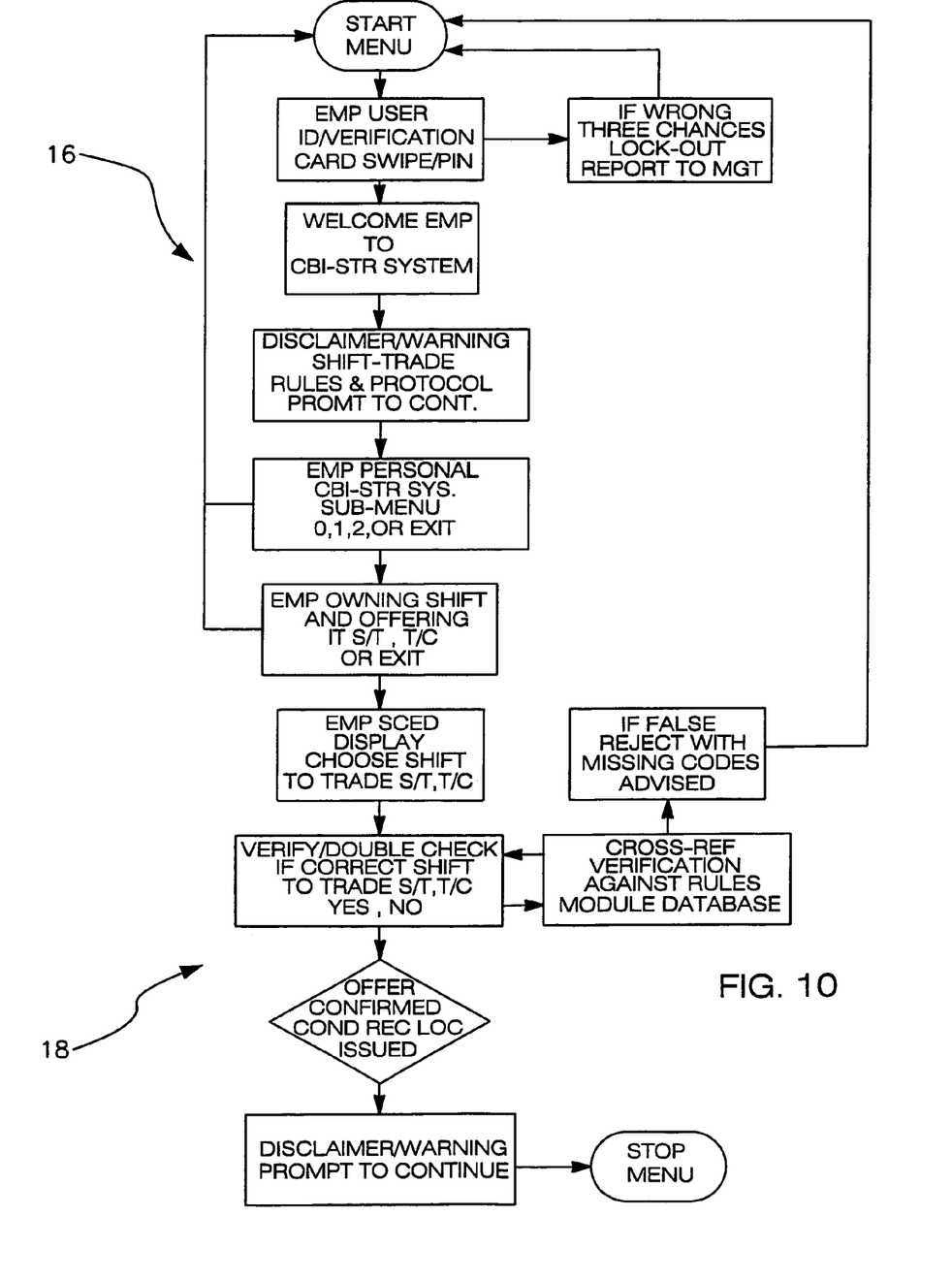
Figure 11:
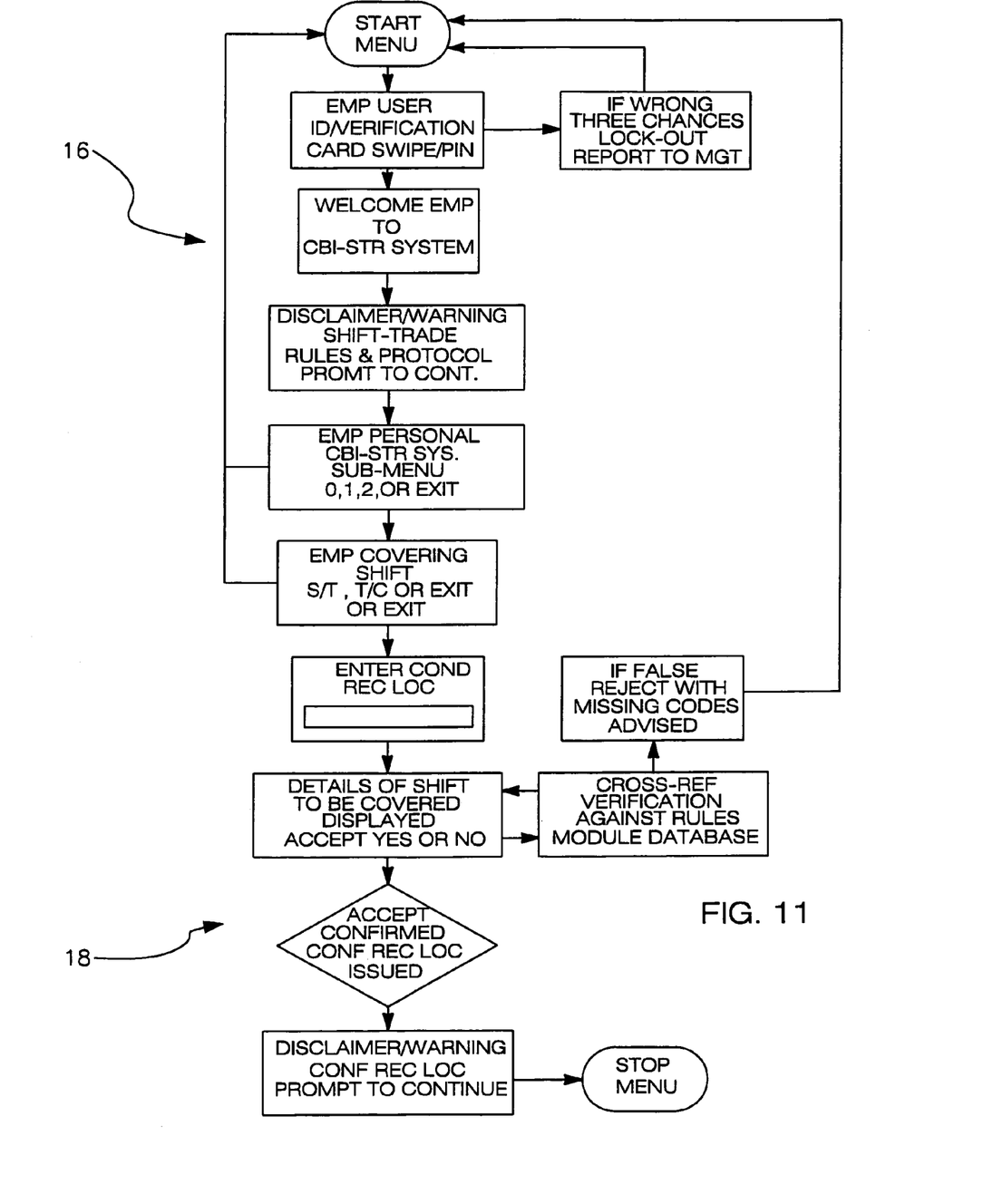
FIG. 11 is a flow chart delineating the process by which the identity of a recipient of a shift is identified and verified. In such subroutine, criteria is checked to ensure that the recipient of a shift is not only qualified with respect to training, but also has a schedule that allows the shift trade.
Figure 12:
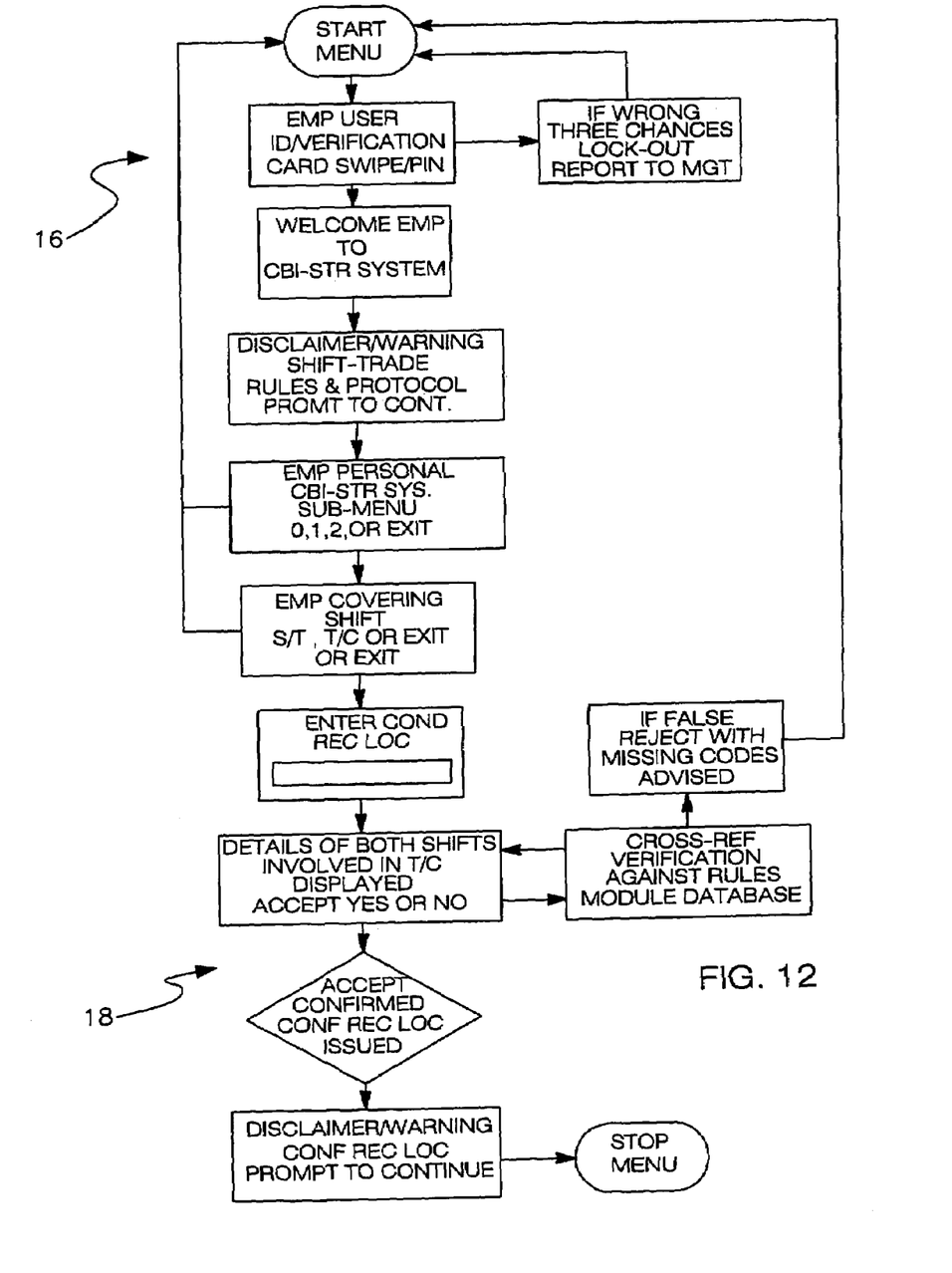

To attain this, the present invention generally comprises a computer with memory having stored therein a plurality of lists. Such lists include a first list of employees each having a criteria of training data associated therewith. A second list is provided including work area functions each having a criteria of training data associated therewith. Further included is a third list of notifications each corresponding to a unique combination of the employees and the work area functions based on the training data associated therewith. Lastly, a fourth list of time shifts of each of the employees is included. It should be noted that each time shift has one of the work area functions associated therewith. Also included is a computer usable medium having a computer-readable program code medium embodied therein. Such computer usable medium serves for controlling the computer to transfer a shift change in a place of employment. The computer-readable program code medium in said article of manufacture includes many subroutines or program code. For example, such computer-readable program code medium includes program code for causing the computer to verify an identity of a management user. As shown in FIGS. 1–9, this program code defines a verification subroutine that works in combination with a plurality of the remaining subroutines of the present invention. Namely, the verification subroutine works in conjunction with a program code for causing the computer to allow the editing of the first, second, third and fourth lists only after the verification of the identity of the management user. These editing subroutines are shown in FIGS. 1–8. Further included is program code for causing the computer to allow the browsing and printing of the fourth list, as shown in FIG. 9. The computer-readable program code medium further includes a transfer subroutine relying on program code for causing the computer to verify an identity of an owner of a shift and program code for causing the computer to verify an identity of a recipient of a shift. Upon the verification of the shift owner and recipient, program code is invoked for carrying out a cross-reference subroutine which causes the computer to automatically edit the fourth list by transferring a shift of the owner to the recipient. It is imperative that this is only carried out if the training data of the recipient matches that of the work area function associated with the shift of the owner. Finally, program code is provided for causing the computer to display one of the notifications from the third list which corresponds to the combination of the training data of the recipient and the training data of the transferred work area function.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new computerized-interactive shift trade recording system apparatus and method which has many of the advantages of the employee shift scheduling devices mentioned heretofore and many novel features that result in a new computerized-interactive shift trade recording system which is not anticipated, rendered obvious, suggested, or even implied by any of the prior art employee shift scheduling devices, either alone or in any combination thereof.

It is another object of the present invention to provide a new computerized-interactive shift trade recording system which may be easily and efficiently manufactured and marketed.

It is a further object of the present invention to provide a new computerized-interactive shift trade recording system which is of a durable and reliable construction.

An even further object of the present invention is to provide a new computerized-interactive shift trade recording system which is susceptible of a low cost of manufacture with regard to both materials and labor, and which accordingly is then susceptible of low prices of sale to the consuming public, thereby making such computerized-interactive shift trade recording system economically available to the buying public.

Still yet another object of the present invention is to provide a new computerized-interactive shift trade recording system which provides in the apparatuses and methods of the prior art some of the advantages thereof, while simultaneously overcoming some of the disadvantages normally associated therewith.

Still another object of the present invention is to provide a new computerized-interactive shift trade recording system for managing shift trading between various employees of an organization in a manner that ensures that employees are qualified for the work functions that they are trading.

Even still another object of the present invention is to provide a new computerized-interactive shift trade recording system that includes a computer with memory including stored therein a first list of employees each having a criteria of training data associated therewith and a second list of work area functions each having a criteria of training data associated therewith; a computer usable code having a computer readable program code medium embodied therein for controlling the transfer of a shift change in a place of employment, the computer readable program code medium in said article of manufacture including computer-readable program code for causing the computer to ascertain an identity of an owner of a shift, computer-readable program code for causing the computer to ascertain an identity of a recipient of a shift, and computer-readable program code for causing the computer to approve the transferring of a shift of the owner to the recipient only if the training data of the recipient matches that of the work area function associated with the shift of the owner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a flow chart delineating the verification subroutine and one of the subroutines, namely the cross-reference subroutine which allows the editing of the rules which govern the program code for causing the computer to automatically edit the fourth list by transferring a shift of the owner to the recipient only if the training data of the recipient matches that of the work area function associated with the shift of the owner and further only if further criteria is met such as non-conflicting schedules and the like.

FIG. 10 is a flow chart delineating the process by which the identity of an owner of a shift is identified and verified. FIG. 10 delineates the procedure with which a shift-trade or time-change must be chosen.

FIG. 12 is a flow chart delineating the process by which the identity of an owner of a shift is identified and verified. FIG. 12 specifically sets forth the process associated with a time-change and further entails the displaying of both shifts which are affected by the trade.

DESCRIPTION OF THE PREFERRED EMBODIMENT

With reference now to the drawings, and in particular to FIGS. 1 through 13 thereof, a new computerized-interactive shift trade recording system embodying the principles and concepts of the present invention and generally designated by the reference numeral 10 will be described.

The present invention, designated as numeral 10, includes a computer with memory having stored therein a plurality of lists. Such lists include a first list of employees each having a criteria of training data, or an employee training record (ETR), associated therewith. A second list is provided including work area functions (WAF) each having a criteria of training data associated therewith. Further included is a third list of notifications, or warning/disclaimer messages (WDM) each corresponding to a unique combination of the employees and the work area functions based on the training data associated therewith. Lastly, a fourth list of time shifts of each of the employees is included. It should be noted that each time shift has one of the work area functions associated therewith.

Also included is a computer usable medium having a computer-readable program code medium embodied therein. Such computer usable medium serves for controlling the computer to transfer a shift change in a place of employment. The computer-readable program code medium in such article of manufacture includes many subroutines or program code.

For example, such computer-readable program code medium includes program code for causing the computer to verify an identity of a management user. As shown in FIGS. 1–9, this program code defines a verification subroutine 12 that works in combination with a plurality of the remaining subroutines of the present invention. Namely, the verification subroutine works in conjunction with a program code for causing the computer to allow the editing of the first, second, third and fourth lists only after the verification of the identity of the management user. These editing subroutines are shown in FIGS. 1–7.

Figure 1:
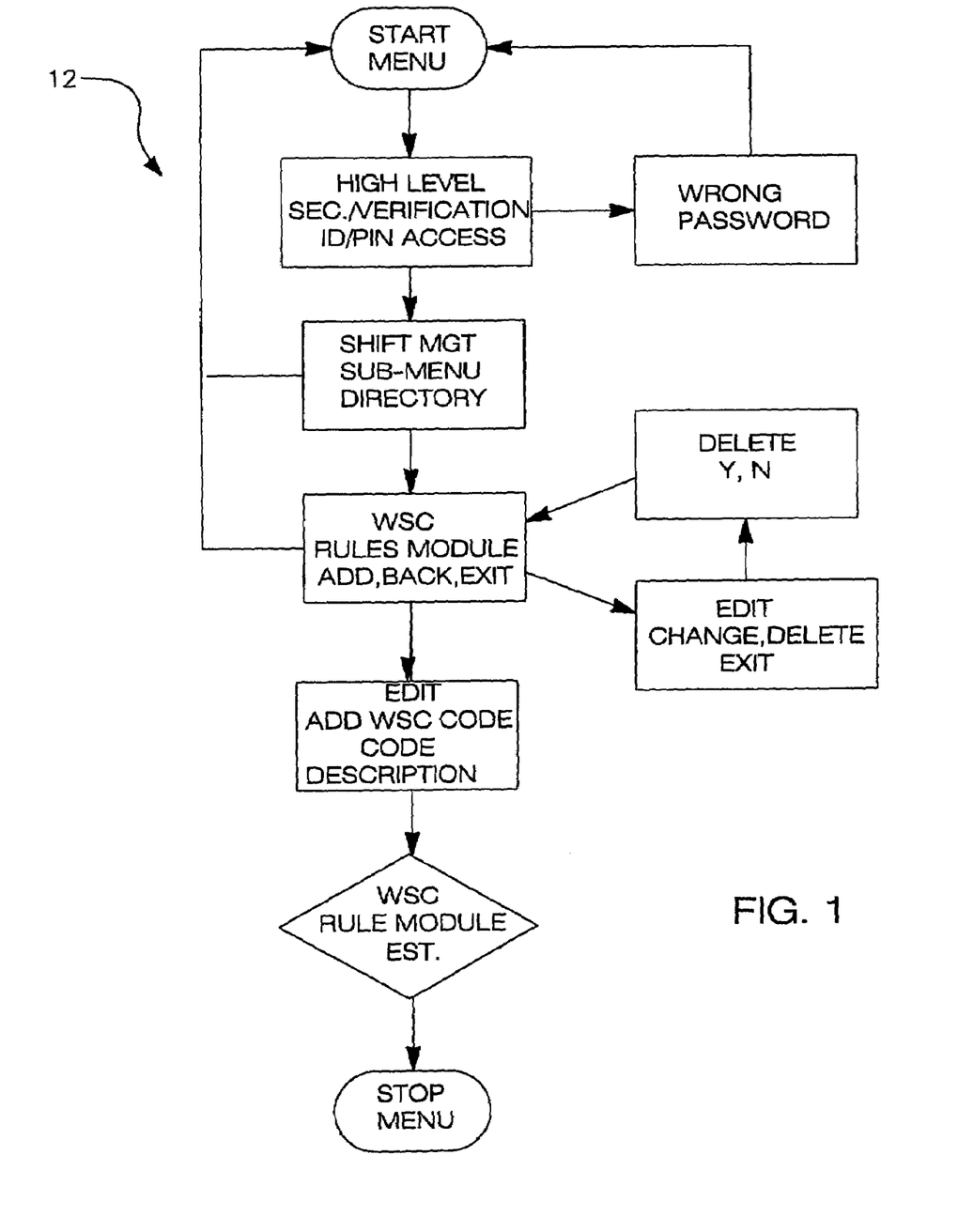
FIG. 1 is a flow chart delineating the verification subroutine and one of the editing subroutines, namely the editing subroutine which allows employee information of the first list to be edited.
Figure 2:
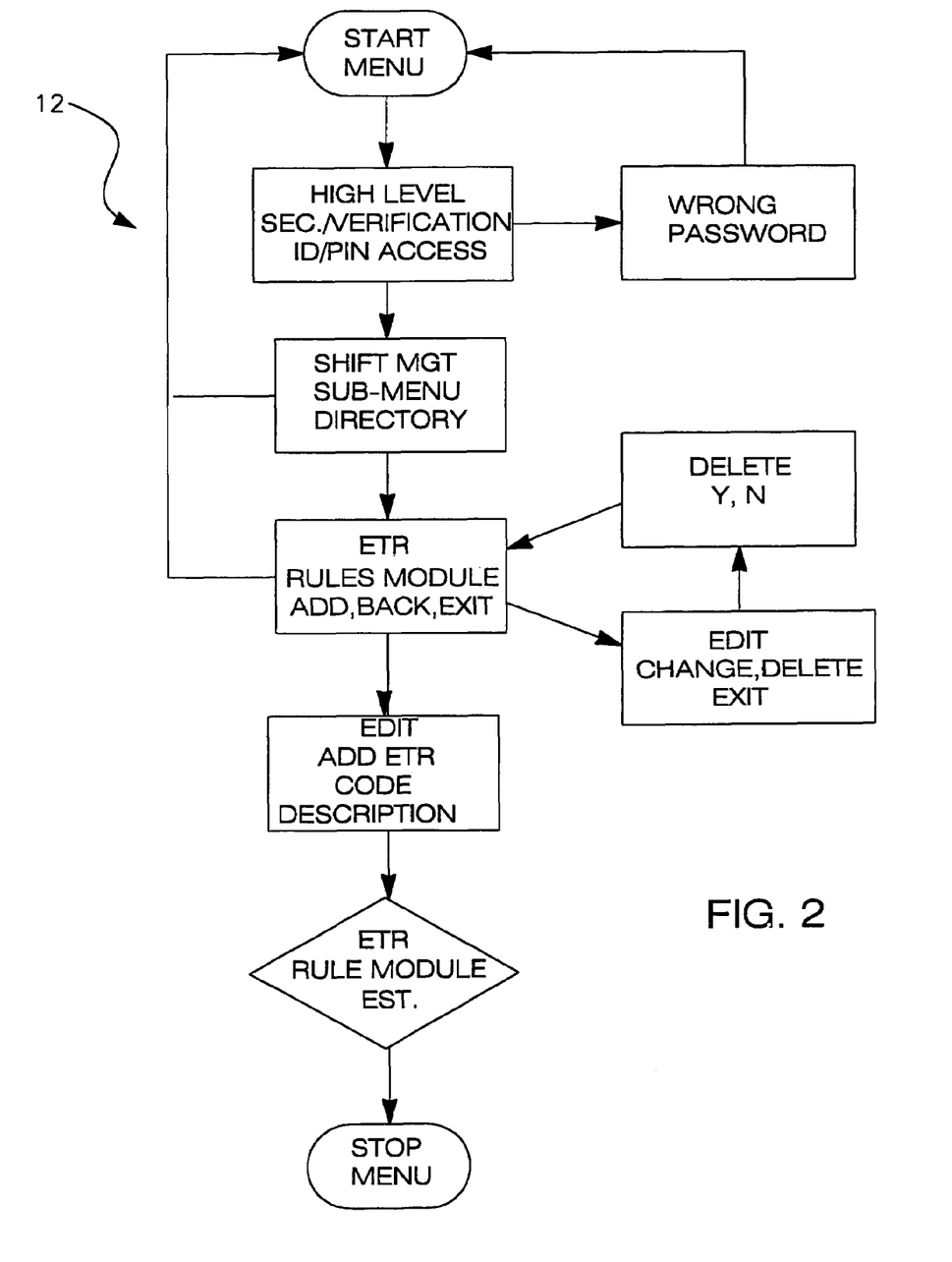
FIG. 2 is a flow chart delineating the verification subroutine and one of the editing subroutines, namely the editing subroutine which allows the training data of the second list to be edited.
Figure 3:
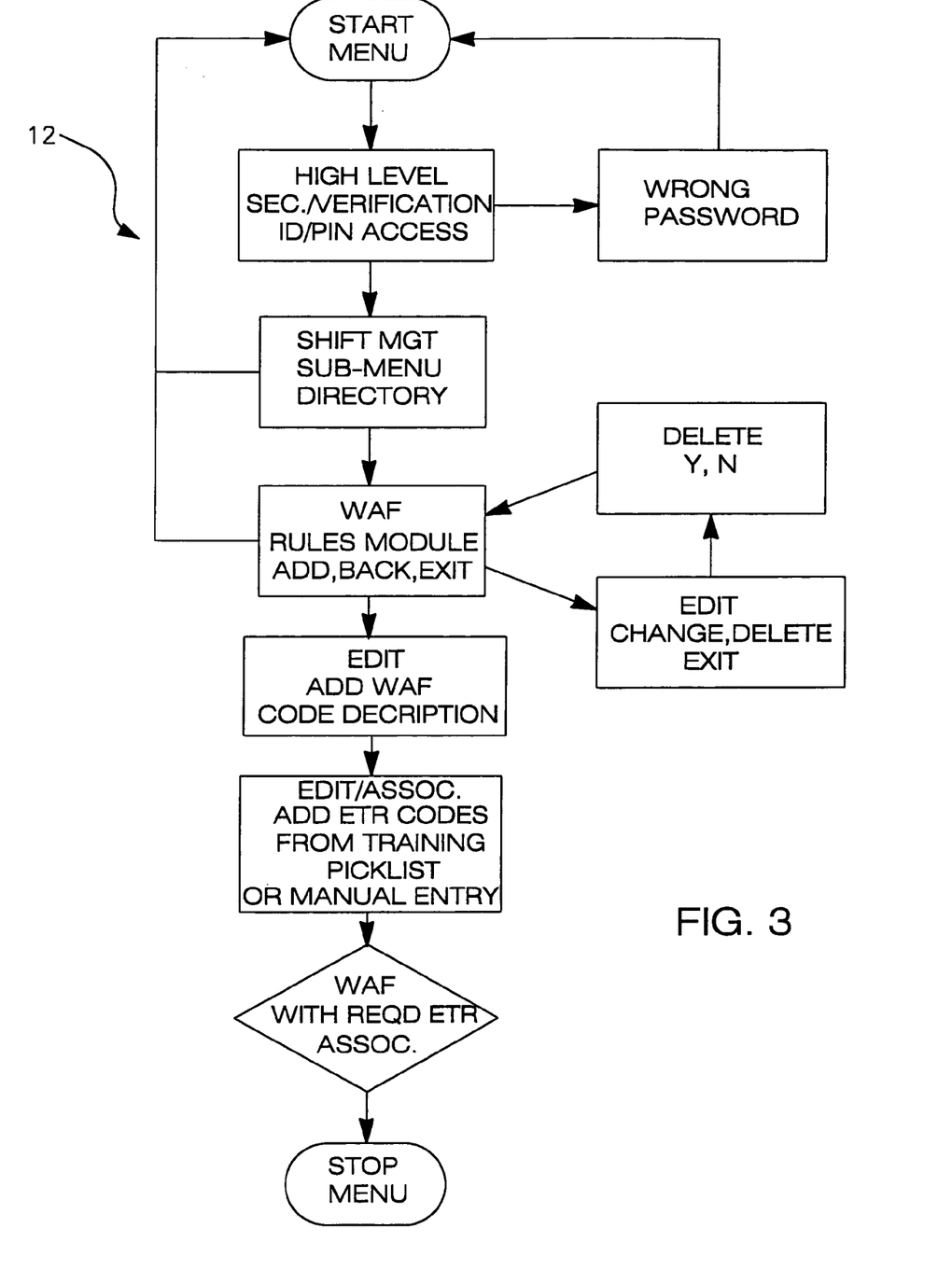
FIG. 3 is a flow chart delineating the verification subroutine and one of the editing subroutines, namely the editing subroutine which allows the work area functions of the second list to be edited.
Figure 5:
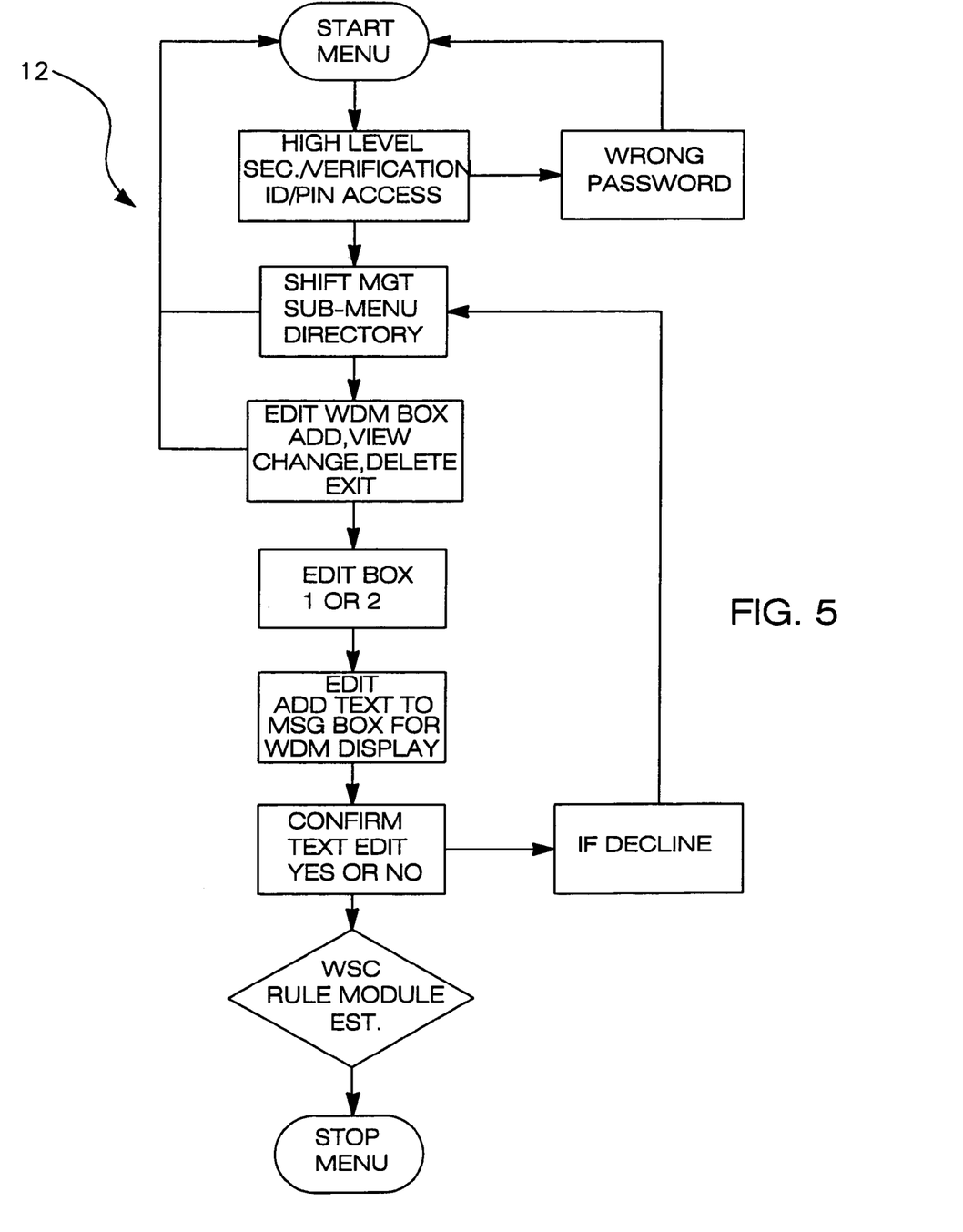
FIG. 5 is a flow chart delineating the verification subroutine and one of the editing subroutines, namely the editing subroutine which allows the notifications of the third list to be edited.
Figure 6:
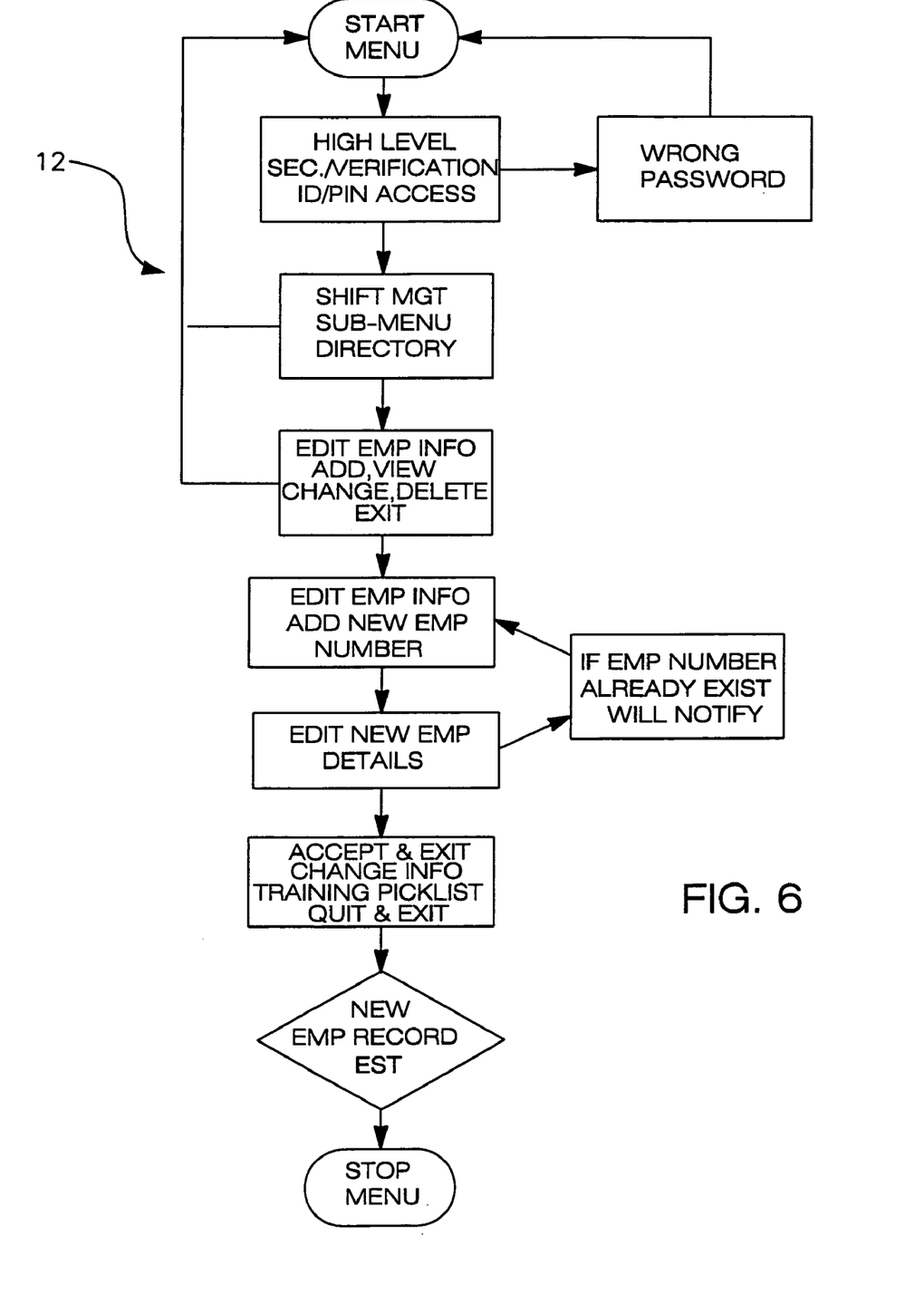
FIG. 6 is a flow chart delineating the verification subroutine and one of the editing subroutines, namely the editing subroutine which allows the employee information of the first list to be edited.
Figure 7:
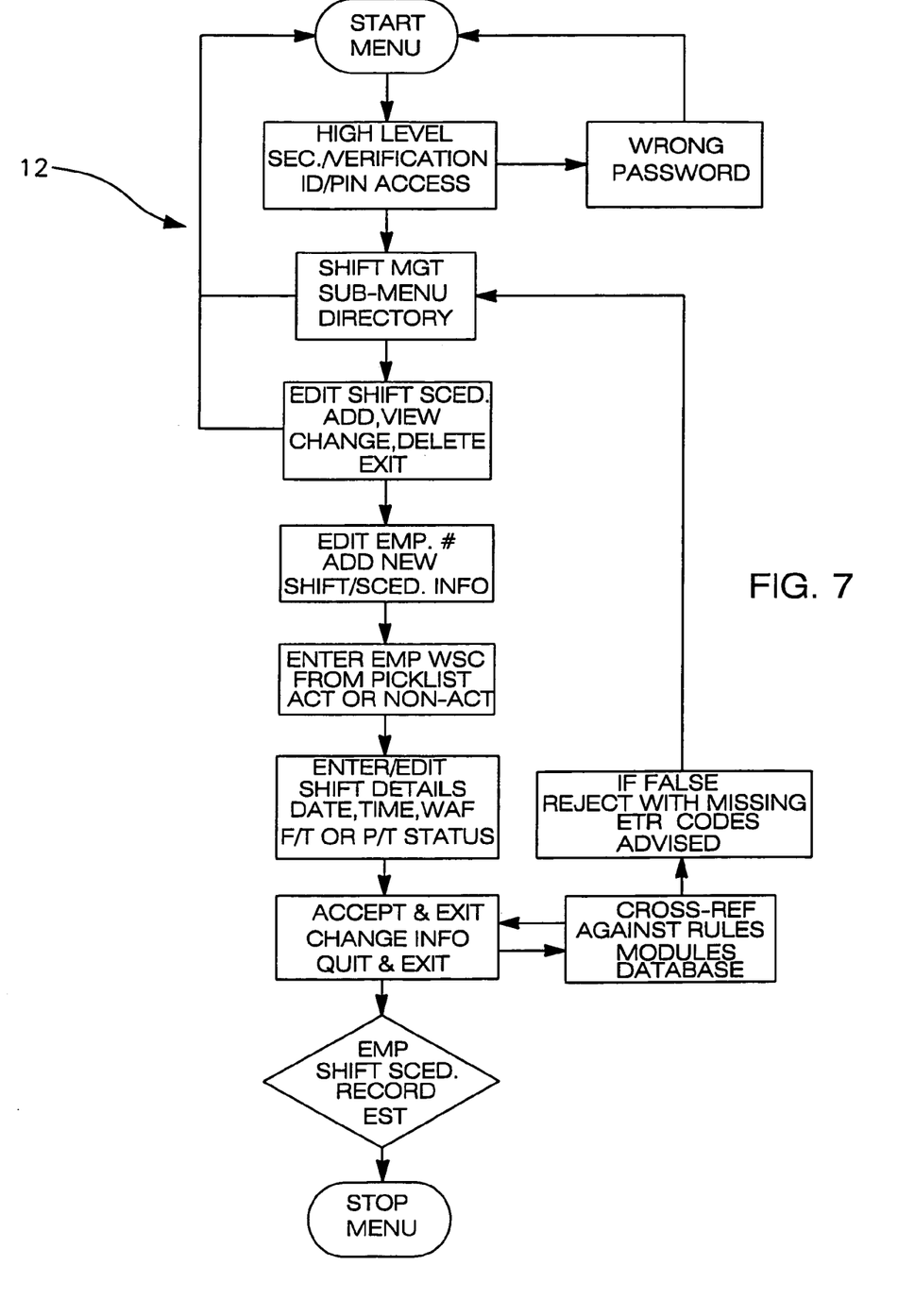
FIG. 7 is a flow chart delineating the verification subroutine and one of the editing subroutines, namely the editing subroutine which allows the shifts of the fourth list to be edited.
Figure 8:
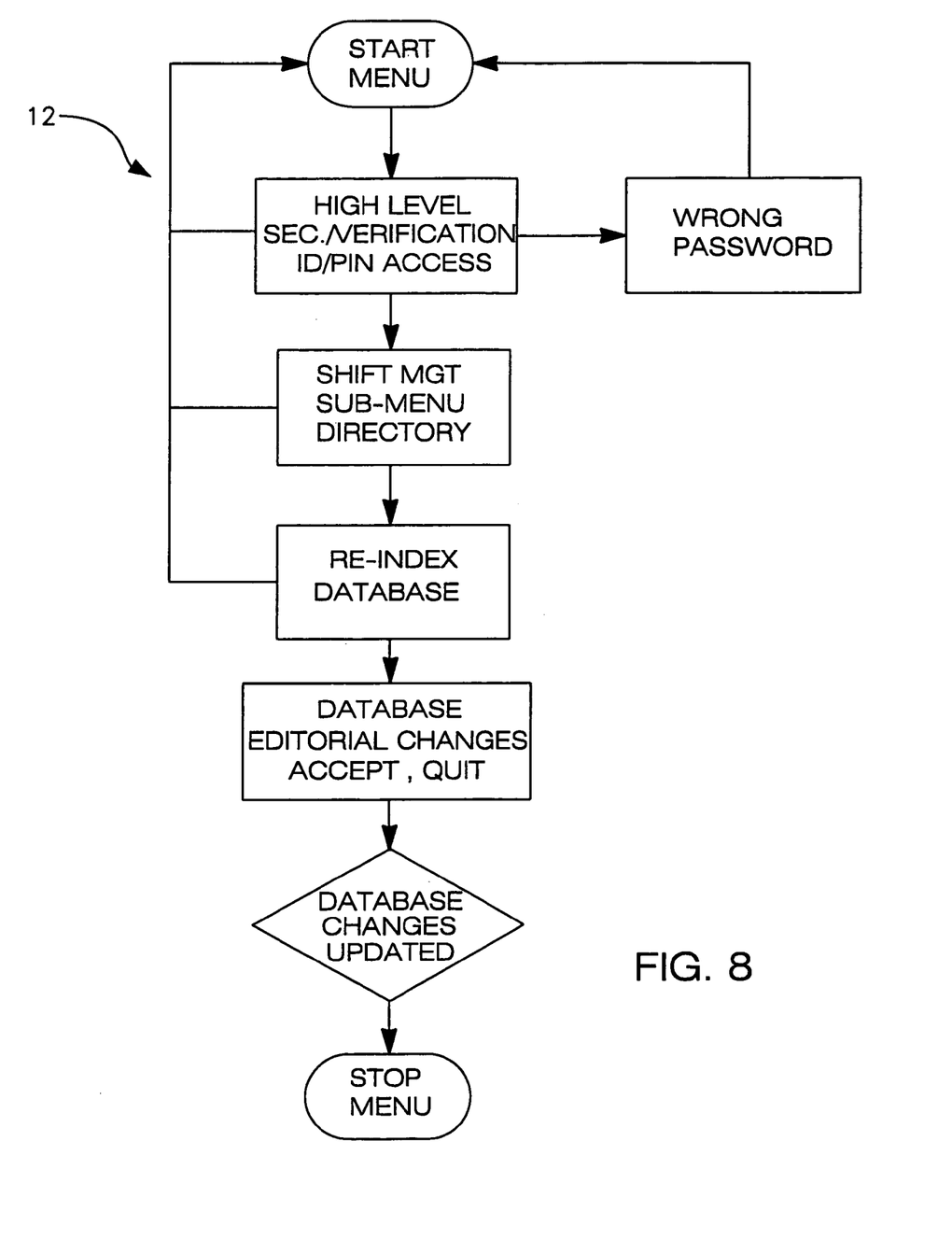
FIG. 8 is a flow chart delineating the process associated with the cross reference subroutine that edits the fourth list automatically.

Specifically, FIG. 1 shows an editing subroutine which allows employee information of the first list to be edited. FIG. 2 shows the editing subroutine which allows the training data of the second list to be edited. FIG. 3 shows the editing subroutine which allows the work area functions of the second list to be edited. FIG. 5 shows the editing subroutine which allows the notifications of the third list to be edited. FIG. 6 is a flow chart showing the editing subroutine which allows the employee information of the first list to be edited. As shown, a PIN number of each employee may be selected. FIG. 7 shows an editing subroutine which allows the shifts of the fourth list to be edited. As shown in the foregoing flowcharts, the pertinent lists are edited by giving the verified management user an opportunity to add, change, or delete the information in the lists.

Further included is program code for causing the computer to allow the browsing and printing of the fourth list, as shown in FIG. 9. Certain information may be found about the shifts of various employees by merely entering the name thereof.

The computer-readable program code medium further includes a transfer subroutine 16 relying on program code for causing the computer to verify an identity of an owner of a shift and program code for causing the computer to verify an identity of a recipient of a shift. To accomplish this, a keypad or magnetic card swiping apparatus may be provided for verifying an identification of an employee stored in the first list.

It should be noted that in the context of the present description, the term shift refers to a complete trade of a shift (usually day for day) and further refers to hourly trades during a single day. A shift trade is where one swaps one calendar day for another. For example, an owner "A" trades a shift on a date with recipient "B", so that owner "A" will owe to work and pay back recipient "B" another shift on a different date. As such, two separate transactions are required for carrying out the above procedure. A distinct time change is the variation where although shifts are still traded, the shifts involved are scheduled within the same day. For example, owner "A" has a morning shift on a date and owner "B" has an afternoon shift on the same date and the owners agree to exchange, or trade shifts. Thus, either the owner and recipient roles may be inter-changed or reversed as either one of the parties can "offer" up one of the shifts as long as the other completes the time-change transaction which will switch the shifts and give one confirmed record locator.

Figure 4:
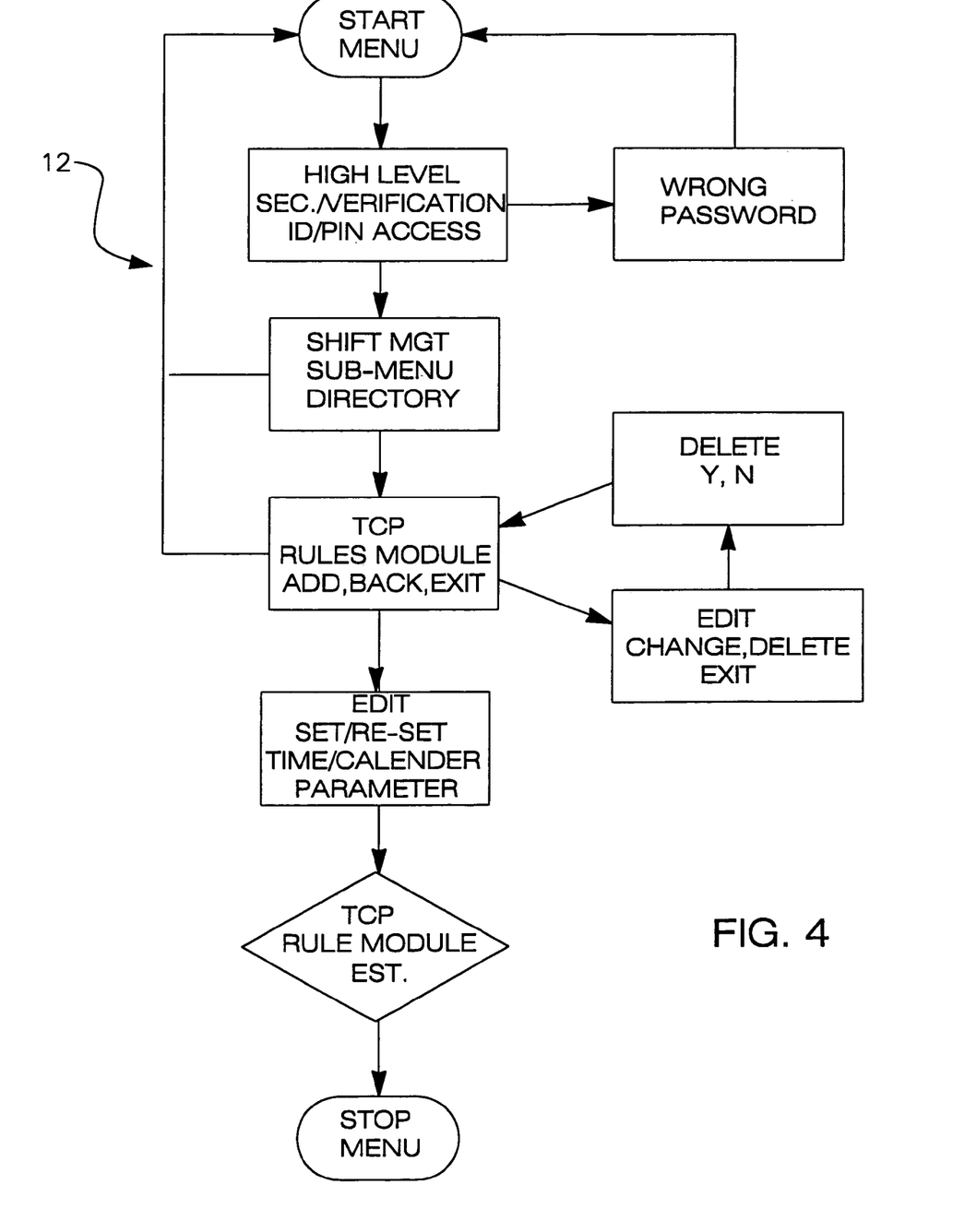

Upon the verification of the shift owner and recipient, program code is invoked for carrying out a cross-reference subroutine 18 which causes the computer to automatically edit the fourth list by transferring a shift of the owner to the recipient. It is imperative that this is only carried out if the training data of the recipient matches that of the work area function associated with the shift of the owner. If the training data does not match, the transfer subroutine is ended. It should be noted that proper training is not the only criteria on which the transfer may depend. For example, conflicting schedules a status of an employee schedule (active and non-active including vacation, sick leave, etc.) may determine whether the transfer is permitted along with any other criteria. The status of an employee schedule or work status code (WSC) may be selectively edited, as shown in FIG. 1. In addition, a length of time before the requested shift trade may also dictate whether the =shift trade is carried out. Such length of time, or time/calendar parameter, may also be selectively edited, as shown in FIG. 4.

Finally, program code is provided for causing the computer to display one of the notifications from the third list which corresponds to the combination of the training data of the recipient and the training data of the transferred work area function. The aforementioned notifications preferably comprise of warnings, caution notices, and the like which are pertinent when one of the employees with certain training data is assigned certain work area functions. As shown in FIG. 5, such notifications may be selectively edited.

Figure 13:
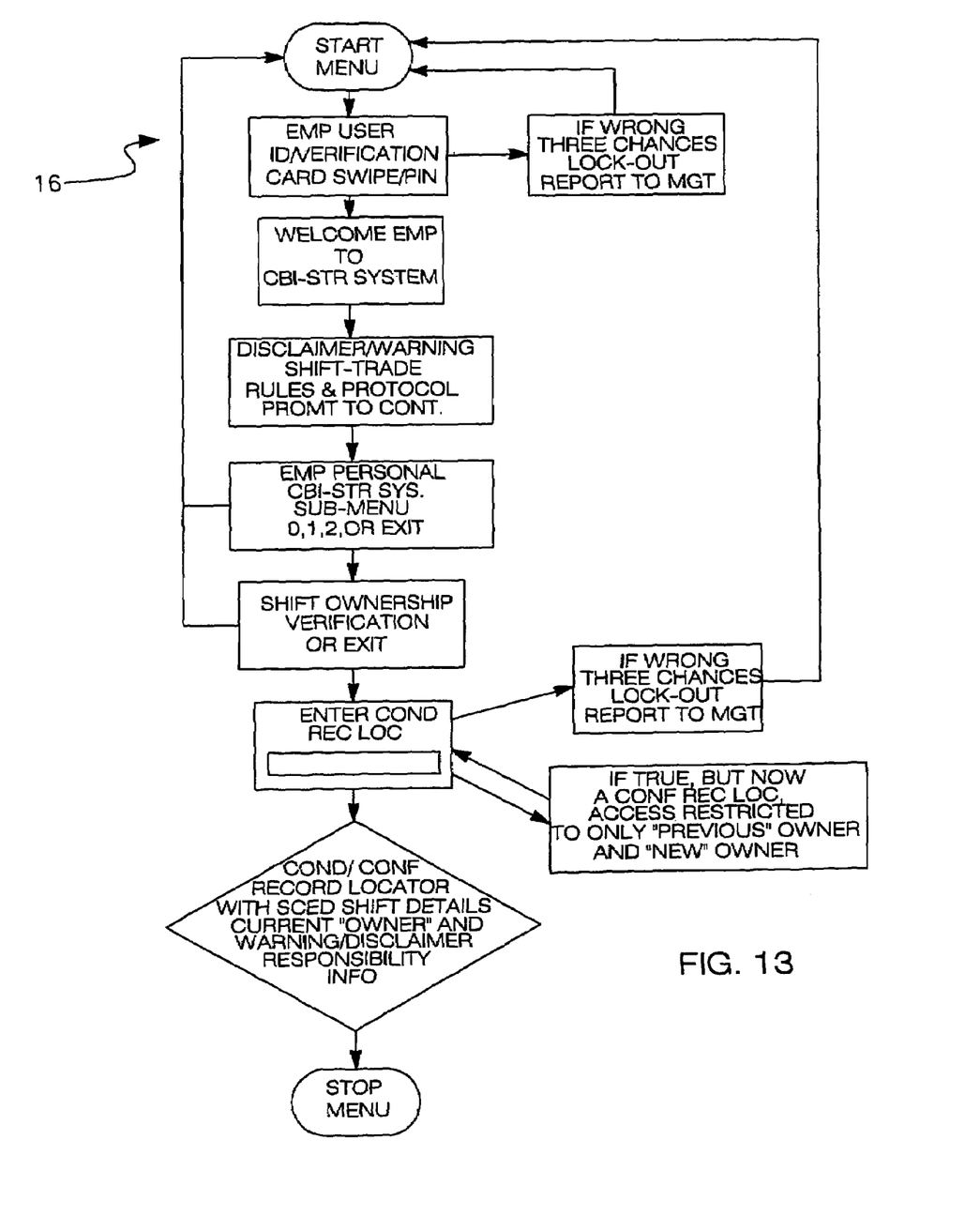
FIG. 13 is a flow chart of an optional record locator feature of the present invention.

FIG. 13 shows an optional record locator feature of the present invention which allows viewing or browsing of shift trades and the status thereof. As shown, an owner of a shift can check to see if the shift they have offered up as conditional to the recipient of the shift has been accepted. In which case, if it has been accepted, it would signal that a confirmed record locator, or record, has been effected. It should be noted that shift trade is given the confirmed status only upon each of the criteria being met. In the conditional stage, it is usual for only the owner and anyone with access to the system that has confidentially obtained the conditional record locator to have access to see it. However, once the recipient has completed the transaction to accept the offered shift, confidentiality is raised to restrict viewing of the confirmed record locator to only the owner and recipient. In fact, the record locator can be entered with a conditional status (usually by the owner to see if the recipient has taken on the shift yet) or a confirmed status (usually by the recipient or owner to verify shift trade status). In summary, the confidentiality of viewing or browsing of shift trades changes between a conditional and confirmed stage, as set forth hereinabove.

It should be noted that the various inputting of information mentioned hereinabove may be accomplished by a keyboard, mouse, light pen, or any other type of input device. Further, to facilitate such entry and also allow the viewing of the notices, prompts and other pertinent information, a display is provided. The computer preferably governs the input device and display by way of the program code which is stored in the machine. It should be noted that the present invention may also be carried out using application specific integrated circuitry, thereby constituting primarily a hardware device.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A computer-implemented method for processing signals related to trading shifts between employees, the method comprising:

accepting by a computer system a conditional offer, by a first employee assigned to work a first shift, to trade the first shift for another shift of another employee;

displaying by the computer system to other employees the conditional offer to trade the first shift for another shift;

receiving by the computer system a conditional acceptance from a second employee to trade a second shift of the second employee for the offered first shift of the first employee; and confirming by the computer system a trade of the first shift of the first employee for the second shift of the second employee upon verification of criteria, or rejecting the trade of the first shift for the second shift upon non-verification of the criteria;

wherein the step of confirming includes checking by the computer system training data associated with the second employee in a training data database, and comparing the training data associated with the second employee with training requirements associated with a work area function to be performed on the first shift to verify that the second employee is qualified to perform the work area functions associated with the first shift;

wherein the step of confirming includes checking by the computer system a length of time between a time of receipt of the conditional acceptance and a time of occurrence of the first shift and the second shift against a predetermined minimum time period for trading shifts to verify that the length of time is not less than the predetermined minimum time period, providing a management user of the computer system with the capability to change the predetermined minimum time period;

additionally including displaying by the computer system to the second employee, upon confirmation of the trade, notifications relevant to the work area function of the first shift and the training data associated with the second employee;

additionally including indicating by the computer system to the first employee, upon confirmation of the trade, the confirmation of the trade; and additionally including restricting by the computer system access to information about the trade of the first shift for the second shift upon confirmation of the trade.

2. A computer-implemented method for processing signals related to trading shifts between employees, the method comprising:

establishing a preliminary schedule of shifts on a computer system;

verifying by the computer system an identity of a first employee;

presenting to the first employee by the computer system the preliminary schedule of shifts;

accepting by the computer system a conditional offer from the first employee, assigned to work a first shift, to trade the first shift of another shift on the preliminary schedule of another employee;

displaying to other employees the conditional offer to trade the first shift of another shift;

verifying by the computer system an identity of a second employee;

receiving a conditional acceptance by the computer system from the second employee to trade a second shift of the second employee for the offered first shift of the first employee; and confirming a trade of the first shift of the first employee for the second shift of the second employee upon verification of criteria, or rejecting the trade of the first shift for the second shift upon non-verification of the criteria, the step of confirming including:

checking training data associated with the second employee in a training data database;

comparing by the computer system the training data associated with the second employee with training requirements associated with a work area function to be performed on the first shift to verify that the second employee is qualified to perform the work area functions associated with the first shift;

checking by the computer system a length of time between a time of receipt of the conditional acceptance and a time of occurrence of the first shift and the second shift against a predetermined minimum time period for trading shifts to verify that the length of time is not less than the minimum time period, providing a management user of the computer system with the capability to change the predetermined minimum time period;

transferring by the computer system, upon confirmation of the trade, the first shift from the first employee to the second employee and transferring the second shift from the second employee to the first employee;

displaying by the computer system to the second employee, upon confirmation of the trade, notifications relevant to the work area function of the first shift and the training data associated with the second employee;

indicating by the computer system to the first employee, upon confirmation of the trade, the confirmation of the trade; and restricting by the computer system access to information about the trade of the first shift for the second shift upon confirmation of the trade.

3. A computer-implemented method for processing signals related to trading shifts between employees, the method comprising:

establishing a preliminary schedule of shifts on a computer system;

presenting to the first employee by the computer system the preliminary schedule of shifts;

accepting by the computer system a conditional offer from a first employee, assigned to work a first shift, to trade the first shift for another shift on the preliminary schedule of another employee;

displaying to other employees the conditional offer to trade the first shift for another shift;

receiving a conditional acceptance by the computer system from a second employee to trade a second shift of the second employee for the offered first shift of the first employee;

confirming a trade of the first shift of the first employee for the second shift of the second employee upon verification of criteria, or rejecting the trade of the first shift for the second shift upon non-verification of the criteria;

transferring by the computer system, upon confirmation of the trade, the first shift from the first employee to the second employee and transferring the second shift from the second employee to the first employee;

wherein the step of confirming includes comparing by the computer system the training data associated with the second employee with training requirements associated with a work area function to be performed on the first shift to verify that the second employee is qualified to perform the work area functions associated with the first shift;

wherein the step of confirming includes checking by the computer system a length of time between a time of receipt of the conditional acceptance and a time of occurrence of the first shift and the second shift against a predetermined minimum time period for trading shifts to verify that the length of time is not less than the minimum time period, providing a management user of the computer system with the capability to change the predetermined minimum time period.

4. The computer-implemented method of claim 3 further comprising verifying by the computer system an identity of a first employee and verifying by the computer system an identity of a second employee.

5. The computer-implemented method of claim 3 wherein the step of confirming includes checking training data associated with the second employee in a training data database.

6. The computer-implemented method of claim 3 wherein the step of confirming includes displaying by the computer system to the second employee, upon confirmation of the trade, notifications relevant to the work area function of the first shift and the training data associated with the second employee.

7. The computer-implemented method of claim 3 wherein the step of confirming includes indicating by the computer system to the first employee, upon confirmation of the trade, the confirmation of the trade.

8. The computer-implemented method of claim 3 wherein the step of confirming includes restricting by the computer system access to information about the trade of the first shift for the second shift upon confirmation of the trade.

9. The computer-implemented method of claim 3 wherein the step of confirming the trade does not require approval of a management user.

10. The computer-implemented method of claim 9 wherein the step of accepting a conditional offer does not require approval of a management user.

* * * * *